United States Patent
Kotani et al.

(10) Patent No.: US 7,399,543 B2
(45) Date of Patent: Jul. 15, 2008

(54) FUEL CELL SYSTEM FOR SCAVENGING SIGNAL PRESSURE LINE FOR REGULATOR

(75) Inventors: Yasunori Kotani, Utsunomiya (JP); Tomoki Kobayashi, Utsunomiya (JP); Minoru Uoshima, Utsunomiya (JP); Chihiro Wake, Shioya-gun (JP); Yoshikazu Murakami, Utsunomiya (JP)

(73) Assignee: Honda Motor Co., Ltd. (JP)

( * ) Notice: Subject to any disclaimer, the term of this patent is extended or adjusted under 35 U.S.C. 154(b) by 351 days.

(21) Appl. No.: 11/226,663

(22) Filed: Sep. 13, 2005

(65) Prior Publication Data
US 2006/0088742 A1    Apr. 27, 2006

(30) Foreign Application Priority Data
Oct. 27, 2004    (JP) .......................... P2004-312298

(51) Int. Cl.
*H01M 8/04*    (2006.01)

(52) U.S. Cl. ......................................... 429/24; 429/25

(58) Field of Classification Search .................... 429/13, 429/24, 25
See application file for complete search history.

(56) References Cited

FOREIGN PATENT DOCUMENTS
JP    2002-373682    * 12/2002

* cited by examiner

*Primary Examiner*—Patrick Ryan
*Assistant Examiner*—Thomas H. Parsons
(74) *Attorney, Agent, or Firm*—Fish & Richardson P.C.

(57) ABSTRACT

A fuel cell system has a fuel cell having a cathode and an anode; a device for supplying an oxidant gas to the cathode; a device for supplying a fuel gas to the anode; a device for controlling a pressure of the oxidant gas in accordance with an operation state of the fuel cell; a regulator to which a pressure of the oxidant gas is applied as a signal pressure via a signal pressure line, wherein the regulator regulates a pressure of the fuel gas based on the signal pressure; and a device for scavenging the signal pressure line by using a scavenging gas when or after electric power generation is stopped. A device for controlling the signal pressure may be provided in the signal pressure line. Preferably, the scavenging gas has a pressure and a temperature higher than those of the oxidant gas supplied to the cathode.

19 Claims, 5 Drawing Sheets

FUEL CELL SYSTEM FOR SCAVENGING SIGNAL PRESSURE LINE FOR REGULATOR

BACKGROUND OF THE INVENTION

1. Field of the Invention

The present invention relates to a fuel cell system having a regulator for regulating a pressure supplied to an anode of a fuel cell, and relates to a method of operating the fuel cell system.

Priority is claimed on Japanese Patent Application No. 2004-312298, filed Oct. 27, 2004, the content of which is incorporated herein by reference.

2. Description of the Related Art

In a known fuel cell system mounted in a fuel cell automobile or the like, an oxidant gas and a fuel gas are respectively supplied to a cathode and an anode of a fuel cell so that electric power is generated due to an electrochemical reaction between the gases.

In power generation using a fuel cell, a pressure difference between the anode and the cathode (i.e., a pressure difference between electrodes) must be maintained within a specific range. Therefore, in order to maintain the pressure difference between an inlet gas pressure at the cathode (i.e., a reference pressure) and a gas pressure supplied to the anode within a specific range, some systems employ a regulator for regulating the pressure of the gas supplied to the anode based on the pressure of the oxidant gas which is applied (to the regulator) as a signal pressure. For example, Japanese Unexamined Patent Application, First Publication No. 2002-373682 discloses a technique for controlling the pressure applied to the cathode by using an air injector, so that the pressure applied to the anode can be automatically regulated via a regulator.

Generally, outside air (i.e., the air outside the fuel cell system) is drawn into the oxidant gas which is used for applying a signal pressure to the regulator. Therefore, depending on the operational time period or outside environment, condensation may be generated in a signal pressure line or an air injector through which the air for applying the signal pressure to the regulator flows. If the operation of the fuel cell system is stopped while such condensation remains in the signal pressure line or the air injector, the condensation may freeze in a low-temperature environment such as that having a sub-zero (or below-freezing) temperature. If the condensation freezes, fine adjustment of the signal pressure cannot be performed when the fuel cell system is started in a low-temperature environment.

SUMMARY OF THE INVENTION

In light of the above circumstances, an object of the present invention is to provide a fuel cell system and a method of operating thereof for preventing residual water in a signal pressure line from freezing, by which fine adjustment of the signal pressure can be performed when the fuel cell system is started in a low-temperature environment.

Therefore, the present invention provides a fuel cell system comprising:

a fuel cell (e.g., a fuel cell 1 in first and second embodiments explained later) having a cathode and an anode;

an oxidant gas supply device (e.g., an air compressor 3 in the embodiments) for supplying an oxidant gas to the cathode of the fuel cell;

a fuel gas supply device (e.g., a hydrogen tank 2 in the embodiments) for supplying a fuel gas to the anode of the fuel cell;

a cathode pressure control device (e.g., an ECU 25 in the embodiments) for controlling a pressure of the oxidant gas supplied to the cathode in accordance with an operation state of the fuel cell;

a regulator (e.g., a regulator 6 in the embodiments) to which a pressure of the oxidant gas supplied from the oxidant gas supply device is applied as a signal pressure via a signal pressure line, wherein the regulator regulates a pressure of the fuel gas supplied to the anode based on the signal pressure; and a scavenging device (e.g., a scavenging gas supply device 19 in the second embodiment) for scavenging the signal pressure line by using a scavenging gas when or after electric power generation of the fuel cell is stopped.

According to the above, even if condensation is generated in the signal pressure line due to the operation time of the fuel cell or external environment, the condensation can be discharged outside by scavenging the signal pressure line by the scavenging device when or after the electric power generation of the fuel cell is stopped. Therefore, even in an atmosphere having a sub-zero temperature, it is possible to prevent the signal pressure line from freezing. Accordingly, even when the system is started in a low-temperature environment, a signal pressure can be highly accurately transmitted via the signal pressure line to the regulator.

The fuel cell system may further comprise a pressure control device (e.g., an air injector in the embodiments), provided in the signal pressure line, for controlling the signal pressure applied to the regulator.

In this case, condensation can be discharged from the signal pressure line or the pressure control device provided therein to the outside by scavenging the signal pressure line by the scavenging device when or after the electric power generation of the fuel cell is stopped. Therefore, even in an atmosphere having a sub-zero temperature, it is possible to prevent the signal pressure line or the pressure control device from freezing. Accordingly, even when the system is started in a low-temperature environment, a signal pressure can be highly accurately transmitted via the signal pressure line to the regulator, so that the signal pressure can be adjusted by the pressure control device with high accuracy.

Preferably, the scavenging gas has a pressure higher than the pressure of the oxidant gas supplied to the cathode measured immediately before the electric power generation of the fuel cell is stopped. Accordingly, performance of discharging condensation, generated in the signal pressure line or the pressure control device, can be improved.

Also preferably, the scavenging gas has a temperature higher than a temperature of the oxidant gas supplied to the cathode measured immediately before the electric power generation of the fuel cell is stopped. Accordingly, relative humidity of the scavenging gas can be reduced, so that the scavenging gas can hold a larger amount of moisture; thus, performance of discharging condensation, generated in the signal pressure line or the pressure control device, can be improved.

The fuel cell system may further comprise a scavenging determination device (e.g., the ECU 25 in the embodiments) for determining whether scavenging by the scavenging device is necessary, wherein the scavenging is performed only when it is determined by the scavenging determination device that the scavenging is necessary.

In this case, scavenging can be performed only when the scavenging determination device determined that it is necessary. Typically, the scavenging determination device determines whether the scavenging is necessary based on a determination whether an outside temperature is equal to or less than a predetermined temperature. Therefore, even in a low-temperature environment, when scavenging is unnecessary, for example, when condensation is not generated in the signal pressure line, it is possible to control the system so as not to perform scavenging, thereby minimizing energy necessary for scavenging.

Typically, the oxidant gas is used as the scavenging gas. In this case, the oxidant gas supply device and the scavenging device can be a common device; thus, it is possible to prevent the number of parts necessary for the system from increasing, and a compact system can be realized.

Preferably, the cathode is also scavenged using the oxidant gas when or after the electric power generation is stopped.

The fuel cell system may further comprise a device (e.g., an air drawing valve 17 in the embodiments) for supplying the oxidant gas to the anode so that the anode is also scavenged using the oxidant gas when or after the electric power generation is stopped.

The present invention also provides a method of operating a fuel cell system including a fuel cell having a cathode and an anode, the method comprising the steps of:

supplying an oxidant gas to the cathode of the fuel cell;
supplying a fuel gas to the anode of the fuel cell;
controlling a pressure of the oxidant gas supplied to the cathode in accordance with an operation state of the fuel cell;
applying a pressure of the supplied oxidant gas as a signal pressure via a signal pressure line to a regulator of the fuel cell system for regulating a pressure of the fuel gas supplied to the anode based on the signal pressure; and
scavenging the signal pressure line by using a scavenging gas when or after electric power generation of the fuel cell is stopped.

Preferably, the scavenging gas has a pressure higher than the pressure of the oxidant gas supplied to the cathode measured immediately before the electric power generation of the fuel cell is stopped.

Also preferably, the scavenging gas has a temperature higher than a temperature of the oxidant gas supplied to the cathode measured immediately before the electric power generation of the fuel cell is stopped.

The method may further comprise the step of determining whether the scavenging of the signal pressure line is necessary, wherein the scavenging is performed only when it is determined that the scavenging is necessary. In this case, whether the scavenging is necessary is determined based on a determination whether an outside temperature is equal to or less than a predetermined temperature.

In a typical example, the oxidant gas is used as the scavenging gas, and the oxidant gas is air.

The method may further comprise the step of scavenging the cathode by using the oxidant gas when or after the electric power generation is stopped.

In addition, the method may further comprise the step of scavenging the anode by supplying the oxidant gas to the anode when or after the electric power generation is stopped.

DETAILED DESCRIPTION OF THE INVENTION

Hereinafter, embodiments according to the present invention will be described with reference to the appended figures.

Figure 1:
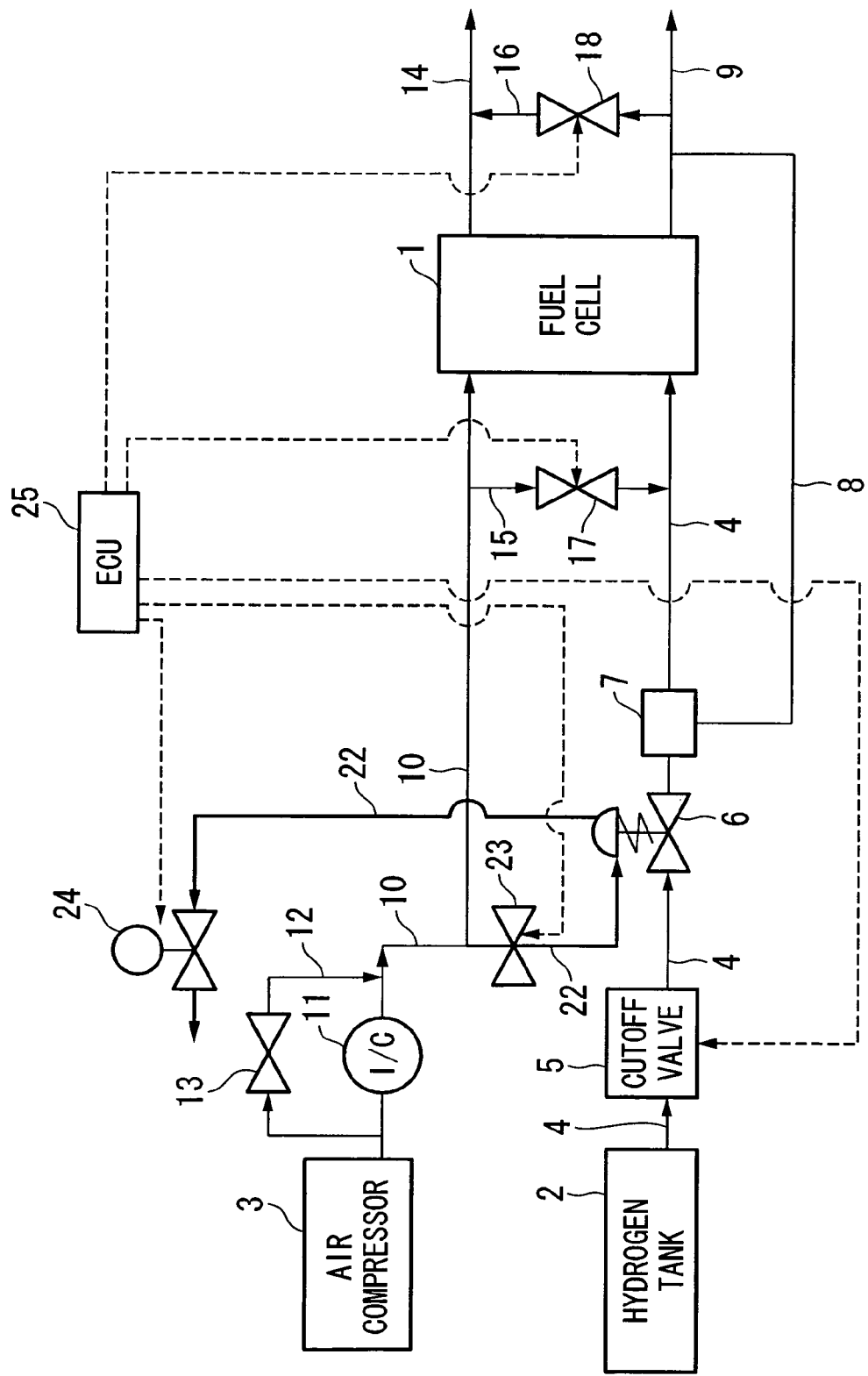
FIG. 1 is a block diagram showing the structure of a fuel cell system as a first embodiment of the present invention.

FIG. 1 is a block diagram showing the structure of a fuel cell system as a first embodiment of the present invention. The system has a fuel cell 1 having a plurality of unit cells which are stacked. In each unit cell, an anode and a cathode are respectively provided on either side of a solid polymer electrolyte membrane, and gas passages for supplying reaction gases are provided on the outside of both the anode and the cathode. In the fuel cell 1, hydrogen gas is supplied as a fuel gas to the anode (i.e., each anode), and air is supplied as an oxidant gas to the cathode (i.e., each cathode), so as to generate electric power.

Hydrogen is supplied from a high-pressure hydrogen tank 2 through a hydrogen supply passage 4, where it passes through a hydrogen cutoff valve 5, is depressurized by a regulator 6 and further passes through an ejector 7, before finally being supplied to the anode of the fuel cell 1. The hydrogen gas is used in electric power generation, and then discharged from the fuel cell 1 as a hydrogen off-gas, which passes through a circulating passage 8 and is drawn into the ejector 7. The gas drawn into the ejector 7 meets the hydrogen gas supplied from the high-pressure hydrogen tank 2, and is supplied to the fuel cell 1 again. Therefore, the hydrogen gas is used while continuously circulating.

The circulating passage 8 is connected to a hydrogen off-gas discharge passage 9 via a purge valve (not shown) which is electromagnetically driven.

Air is compressed by an air compressor 3 and supplied to an air supply passage 10. This air is cooled by an intercooler (I/C) 11, and then supplied to the cathode of the fuel cell 1. The oxygen in this air is provided as an oxidant, and the air is then discharged as an air off-gas from the fuel cell 1 through an air off-gas discharge passage 14.

To the air supply passage 10, a bypass passage 12 for bypassing the intercooler 11 is connected. The bypass passage 12 has a bypass passage open/close valve 13. The flow of the air through the bypass passage 12 can be permitted or cut off (i.e., regulated) by opening or closing the bypass passage open/close valve 13.

In addition, a signal pressure line 22 is connected to the air supply passage 10 on the downstream side of the intercooler 11 and the bypass passage 12. The signal pressure line 22 has a signal pressure line open/close valve 23 in the vicinity of the point where the signal pressure line 22 connects to the air supply passage 10. The flow of the air through the signal pressure line 22 can be permitted or cut off by opening or closing the signal pressure line open/close valve 23.

The signal pressure line 22 is also connected to the regulator 6 on the downstream side of the signal pressure line open/close valve 23.

The regulator 6 may be comprised of an air proportional pressure control valve (not shown), into which the pressure of the air supplied from the air compressor 3 to the signal pressure line 22 is input as a signal pressure. The regulator 6 performs decompression control so as to maintain the hydrogen pressure at the outlet of the regulator 6 within a pressure range which is predetermined according to the signal pressure. In the present embodiment, the control is performed on the basis of the atmospheric pressure in a manner such that the pressure at the outlet of the regulator 6 is several times (e.g., three times) as large as the signal pressure.

In addition, the signal pressure line 22 has an air injector 24 on the downstream side of the regulator 6. The signal pressure input into the regulator 6 can be controlled by adjusting the degree of opening of the air injector 24.

The hydrogen supply passage 4 and the air supply passage 10 are connected to each other via a supply junction passage 15 which has an open/close valve 17 (i.e., an air drawing valve). The flow of the gas (i.e., air in the present embodiment) into the supply junction passage 15 can be permitted or cut off (i.e., regulated) by opening or closing the open/close valve 17.

The hydrogen off-gas discharge passage 9 and the air off-gas discharge passage 14 are connected to each other via a discharge junction passage 16, which has an open/close valve 18 (i.e., an air discharge valve). The flow of the gas (i.e., the air in the present embodiment) into the discharge junction passage 16 can be permitted or cut off by opening or closing the open/close valve 18.

The system also has an ECU (electronic control unit) 25 which drives the air compressor 3 in accordance with an output (value) required (i.e., a required output) for the fuel cell 1 and the operation state of the fuel cell 1, so as to supply a specific amount of air to the fuel cell 1. The ECU 25 also controls (i) the opening/closing operation of each of the cutoff valve 5 and the open/close valves 13, 23, 17, and 18, and (ii) the degree of opening of the air injector 24. In addition, the ECU 25 determines whether a scavenging operation (explained later) is necessary.

Figure 2:
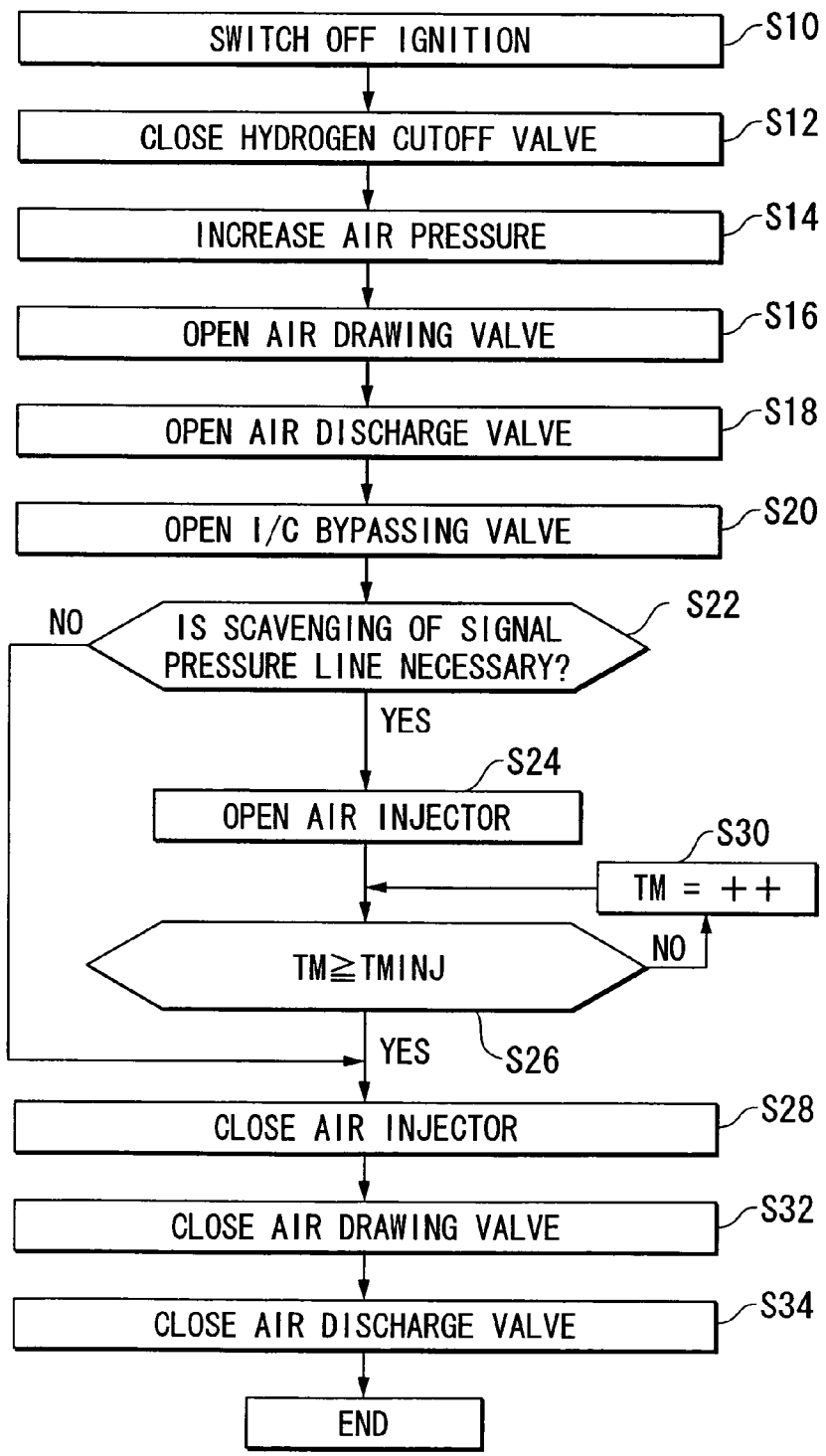
FIG. 2 is a flow chart showing the operation of the fuel cell system in FIG. 1.
Figure 3:
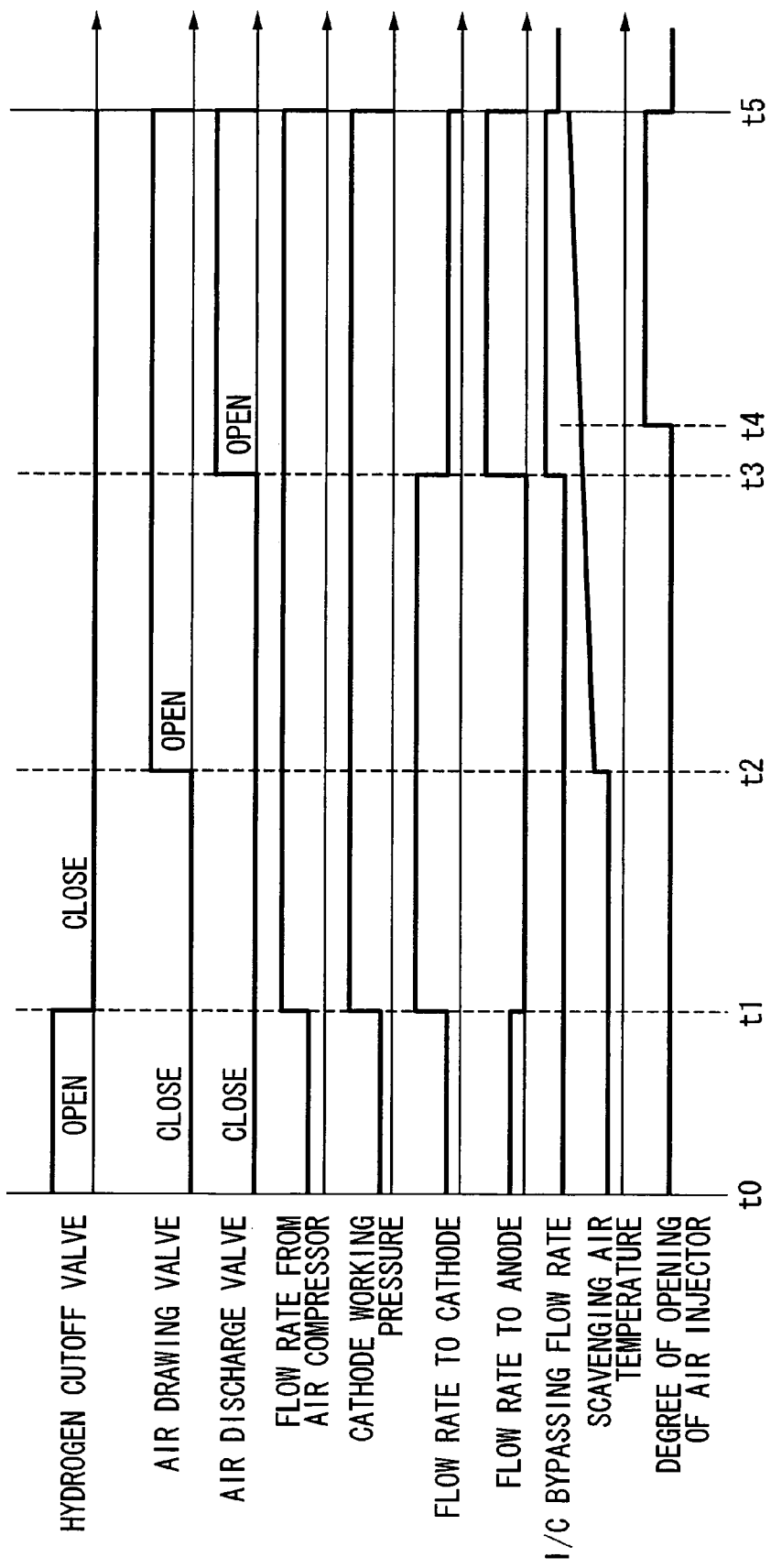
FIG. 3 is a timing chart showing variations of the states of the valves, the air compressor, the gases drawn into the cathode and the anode, the bypass passage, scavenging air, and the air injector in the first embodiment.

The operation of the fuel cell system having the above-described structure will be explained below. FIG. 2 is a flow chart showing the operation of the fuel cell system in FIG. 1. FIG. 3 is a timing chart showing variations of (i) the state of each of the hydrogen cutoff valve 5, the air drawing valve 17, and the air discharge valve 18, (ii) the flow rate from the air compressor 3, (iii) the working pressure of the cathode (i.e., the pressure of the gas drawn into the cathode), (iv) the flow rate to the cathode (i.e., the flow rate of the gas drawn into the cathode), and the flow rate to the anode (i.e., the flow rate of the gas drawn into the anode), (v) the rate of flow bypassing the intercooler 11 (i.e., the flow rate of the bypass passage 12), (vi) temperature of scavenging air, and (vii) degree of opening of the air injector 24.

In the first step S10, an ignition switch of a vehicle in which the fuel cell system is mounted is switched from ON to OFF, so that a signal for stopping the fuel cell operation is input (time t1). In the next step S12, the cutoff valve 5 of the hydrogen supply passage 4 is closed, so that the supply of hydrogen to the anode of the fuel cell 1 is stopped (i.e., electric power generation is stopped).

In the next step S14, the rotation speed of the air compressor 3 is increased so as to increase the pressure of the air supplied to the air supply passage 10. This air is supplied via the air supply passage 10 to the cathode of the fuel cell 1, so as to subject the cathode to a scavenging operation. In the present embodiment, the gas for scavenging is air, and the air compressor 3 is used as a scavenging device. Accordingly, it is possible to prevent the number of parts necessary for the system from increasing, and a compact system can be realized.

In step S16, the air drawing valve 17 is opened, so that the air supplied from the air compressor 3 is drawn into the hydrogen supply passage 4 via the supply junction passage 15 (time t2). The air is then supplied from the hydrogen supply passage 4 to the anode of the fuel cell 1, so that the anode is subjected to a scavenging operation.

In the next step S18, the air discharge valve 18 is opened, so that the air after scavenging is discharged outside via the hydrogen off-gas discharge passage 9, the discharge junction passage 16, and the air off-gas discharge passage 14 (time t3). As described above, not only the cathode but also the anode can be subjected to air scavenging; thus, scavenging can be performed without consuming hydrogen.

In step S20, the bypass passage open/close valve 13 for bypassing the intercooler 11 is opened, so that the air is drawn into the bypass passage 12. Accordingly, the flow rate of the air passing through the intercooler 11 for cooling the air is decreased, thereby increasing the temperature of the air supplied to the cathode of the fuel cell 1. As a result, relative humidity of the air can be reduced, so that the air can hold a larger amount of moisture.

In step S22, it is determined whether the signal pressure line 22 should be subjected to a scavenging process, that is, whether scavenging is necessary. If the result of the determination is "YES", the operation proceeds to step S24, while if the result of the determination is "NO", the operation proceeds to step S28. In the present embodiment, whether scavenging is necessary is determined based on a determination whether the outside temperature is equal to or less than a predetermined temperature (e.g., zero). The predetermined temperature may be set in consideration of season, date, place, or the like. For example, when the determination in step S22 is performed in the daytime, the predetermined temperature may be set to a value higher than zero in consideration of the air temperature at the nighttime of the present season, and the like.

In step S24, the degree of opening of the air injector 24 is increased so as to make the air for scavenging flow through the signal pressure line 22 and the air injector 24 (time t4), and simultaneously, time measurement using a timer is started. In the next step S26, it is determined whether a period of time TM measured by the timer is equal to or greater than a predetermined value TMINJ. If the result of the determination is "YES", the operation proceeds to step S28, while if the result of the determination is "NO", the operation proceeds to step S30. In step S30, the value of the timer is increased by a specific unit value, and the operation returns to step S26.

In step S28, the air injector 24 is closed, so that scavenging of the signal pressure line 22 and the air injector 24 is terminated (time t5). Simultaneously, the air drawing valve 17 is closed (see step S32), and the air discharge valve 18 is also closed (see step S34) so that the supply of the air to the anode is stopped. The air compressor 3 is also stopped, and the operation of the flow in FIG. 2 is completed.

Figure 4:
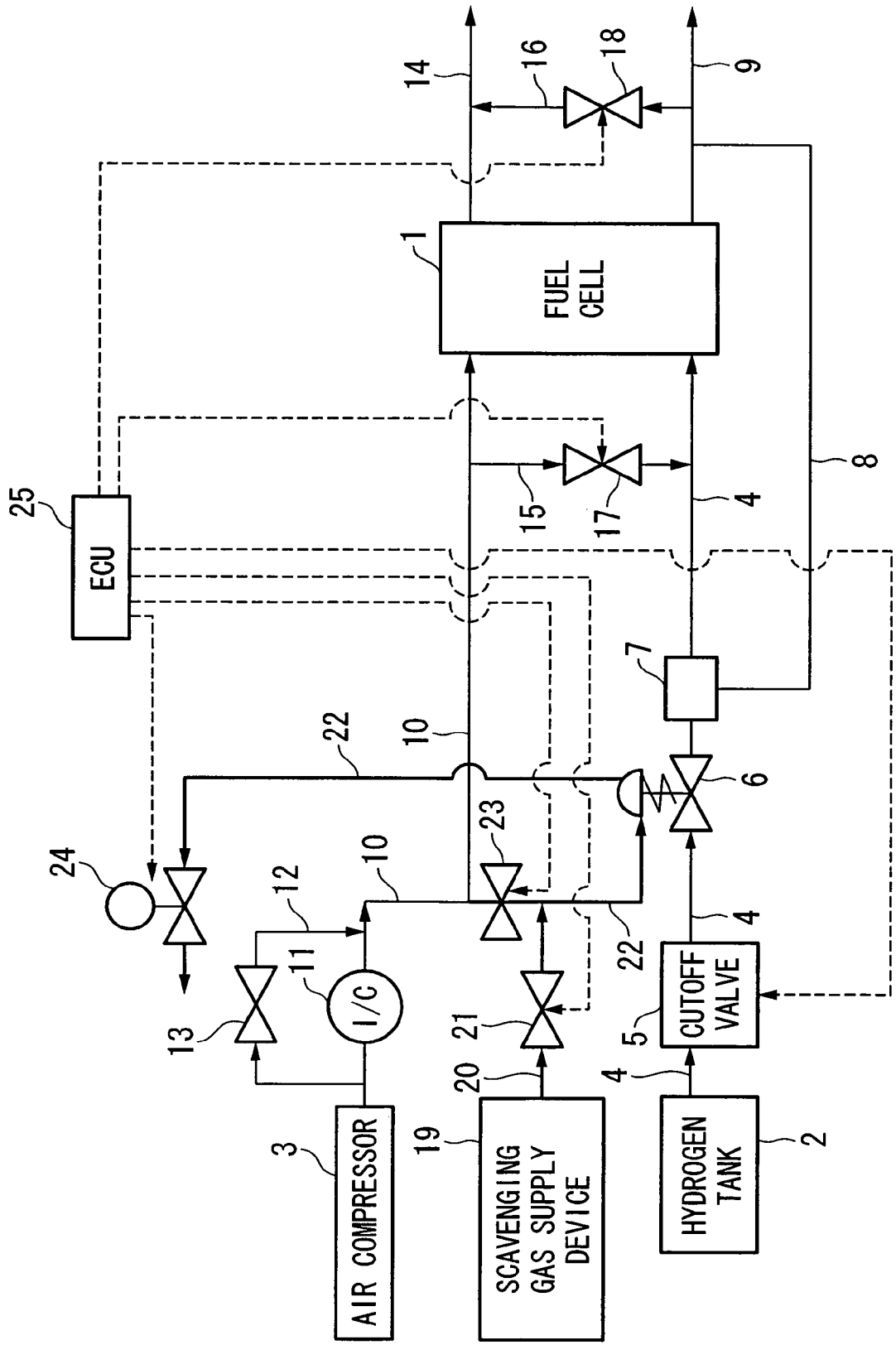
FIG. 4 is a block diagram of the fuel cell system of the second embodiment of the present invention.
Figure 5:
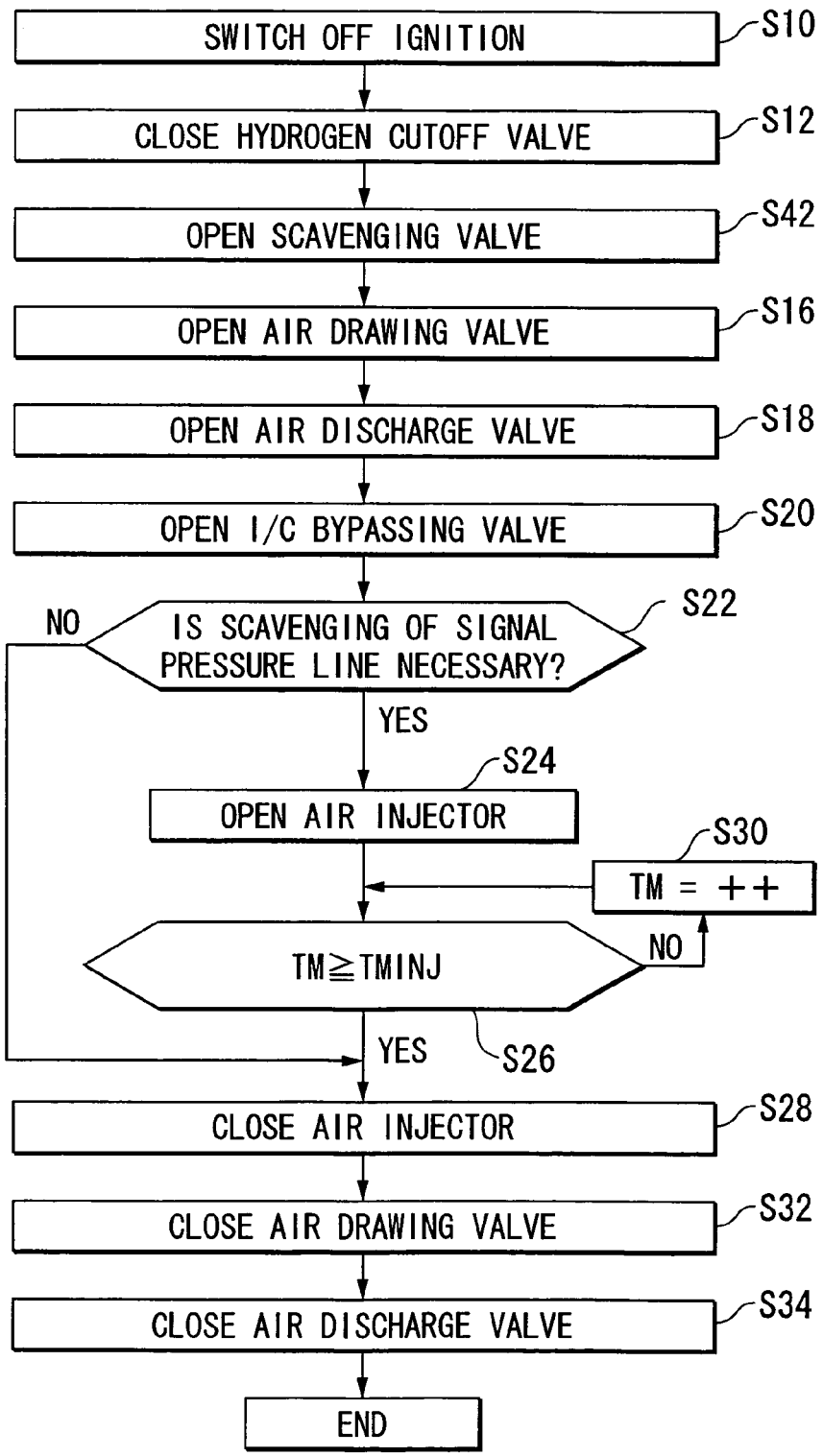
FIG. 5 is a flowchart showing the operation of the fuel cell system in FIG. 4.

Below, a second embodiment of the present invention will be explained with reference to FIGS. 4 and 5. FIG. 4 is a block diagram of the fuel cell system of the second embodiment, and FIG. 5 is a flowchart showing the operation of the fuel cell system in FIG. 4. In the following explanations, structural elements and processes identical or similar to those in the first embodiment are given identical reference numerals or symbols, and explanations thereof are appropriately omitted.

As shown in FIG. 4, the fuel cell system in the present embodiment has a scavenging gas supply device 19 connected to the signal pressure line 22 via a scavenging gas supply passage 20. The scavenging gas supply passage 20 is connected to the signal pressure line 22 on the downstream side of the signal pressure line open/close valve 23 and the upstream side of the regulator 6. The scavenging gas supply passage 20 has a scavenging gas supply passage open/close valve 21 (i.e., a scavenging valve), so that the flow of a scavenging gas through the scavenging gas supply passage 20 can be permitted or cut off (i.e., regulated) by opening or closing the scavenging gas supply passage open/close valve 21. The scavenging gas may be an inert gas such as nitrogen, or air.

In the operation of the fuel cell system of the present embodiment (see FIG. 5), after the hydrogen cutoff valve 5 is closed (see step S12), the process of step S42 is performed. In step S42, the scavenging valve 21 is opened so as to supply the scavenging gas from the scavenging gas supply device 19 to the scavenging gas supply passage 20. The subsequent processes are similar to those shown in FIG. 2, and explanations thereof are omitted. As explained above, in the present embodiment, the anode and the cathode of the fuel cell 1, the signal pressure line 22, and the air injector 24 are subjected to scavenging by using the scavenging gas supplied from the scavenging gas supply device 19.

As explained above, in the first and second embodiments, even if condensation is generated in the signal pressure line 22 or the air injector 24 due to the operation time of the fuel cell 1 or external environment, the condensation can be discharged outside. Therefore, even in an atmosphere having a sub-zero (or below-freezing) temperature, it is possible to prevent the signal pressure line 22 or the air injector 24 from freezing. Accordingly, even when the system is started in a low-temperature environment, a signal pressure can be highly accurately transmitted via the signal pressure line 22 to the regulator 6, so that the signal pressure can be adjusted by the air injector 24 with high accuracy.

In addition, the air for scavenging the signal pressure line 22 and the air injector 24 has a pressure and a temperature which are higher than the pressure and the temperature of the air supplied to the cathode measured immediately before the electric power operation of the fuel cell 1 is stopped; thus, the performance of discharging condensation can be improved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

For example, in the above-described embodiments, the anode and the cathode are subjected to scavenging in different steps; however, they may be simultaneously subjected to scavenging. In addition, scavenging of the signal pressure line 22 and the air injector 24 may be performed simultaneously with scavenging of the cathode or the anode.

If air is used as the scavenging gas, the bypass passage open/close valve 13 may be opened when scavenging of the cathode or the anode is started.

What is claimed is:

1. A fuel cell system comprising:
   a fuel cell having a cathode and an anode; an oxidant gas supply device for supplying an oxidant gas to the cathode of the fuel cell;
   a fuel gas supply device for supplying a fuel gas to the anode of the fuel cell;
   a cathode pressure control device for controlling a pressure of the oxidant gas supplied to the cathode in accordance with an operation state of the fuel cell;
   a regulator to which a pressure of the oxidant gas supplied from the oxidant gas supply device is applied as a signal pressure via a signal pressure line, wherein the regulator regulates a pressure of the fuel gas supplied to the anode based on the signal pressure; and
   a scavenging device for scavenging the signal pressure line by using a scavenging gas when or after electric power generation of the fuel cell is stopped.

2. The fuel cell system according to claim 1, further comprising a pressure control device, provided in the signal pressure line, for controlling the signal pressure applied to the regulator.

3. The fuel cell system according to claim 1, wherein the scavenging gas has a pressure higher than the pressure of the oxidant gas supplied to the cathode measured immediately before the electric power generation of the fuel cell is stopped.

4. The fuel cell system according to claim 1, wherein the scavenging gas has a temperature higher than a temperature of the oxidant gas supplied to the cathode measured immediately before the electric power generation of the fuel cell is stopped.

5. The fuel cell system according to claim 1, further comprising a scavenging determination device for determining whether scavenging by the scavenging device is necessary, wherein the scavenging is performed only when it is determined by the scavenging determination device that the scavenging is necessary.

6. The fuel cell system according to claim 5, wherein the scavenging determination device determines whether the scavenging is necessary based on a determination whether an outside temperature is equal to or less than a predetermined temperature.

7. The fuel cell system according to claim 1, wherein the oxidant gas is used as the scavenging gas.

8. The fuel cell system according to claim 1, wherein the oxidant gas is air.

9. The fuel cell system according to claim 1, wherein the cathode is also scavenged using the oxidant gas when or after the electric power generation is stopped.

10. The fuel cell system according to claim 1, further comprising a device for supplying the oxidant gas to the anode so that the anode is also scavenged using the oxidant gas when or after the electric power generation is stopped.

11. A method of operating a fuel cell system including a fuel cell having a cathode and an anode, the method comprising the steps of: supplying an oxidant gas to the cathode of the fuel cell; supplying a fuel gas to the anode of the fuel cell; controlling a pressure of the oxidant gas supplied to the cathode in accordance with an operation state of the fuel cell; applying a pressure of the supplied oxidant gas as a signal pressure via a signal pressure line to a regulator of the fuel cell system for regulating a pressure of the fuel gas supplied to the anode based on the signal pressure; and scavenging the signal pressure line by using a scavenging gas when or after electric power generation of the fuel cell is stopped.

12. The method according to claim 11, wherein the scavenging gas has a pressure higher than the pressure of the oxidant gas supplied to the cathode measured immediately before the electric power generation of the fuel cell is stopped.

13. The method according to claim 11, wherein the scavenging gas has a temperature higher than a temperature of the oxidant gas supplied to the cathode measured immediately before the electric power generation of the fuel cell is stopped.

14. The method according to claim 11, further comprising the step of determining whether the scavenging of the signal pressure line is necessary, wherein the scavenging is performed only when it is determined that the scavenging is necessary.

15. The method according to claim 14, wherein whether the scavenging is necessary is determined based on a determination whether an outside temperature is equal to or less than a predetermined temperature.

16. The method according to claim 11, wherein the oxidant gas is used as the scavenging gas.

17. The method according to claim 11, wherein the oxidant gas is air.

18. The method according to claim 11, further comprising the step of scavenging the cathode by using the oxidant gas when or after the electric power generation is stopped.

19. The method according to claim 11, further comprising the step of scavenging the anode by supplying the oxidant gas to the anode when or after the electric power generation is stopped.

* * * * *